Dec. 27, 1966  C. E. BITTAKER, JR  3,293,792
FISHING LINE ACCESSORY
Filed Nov. 4, 1964
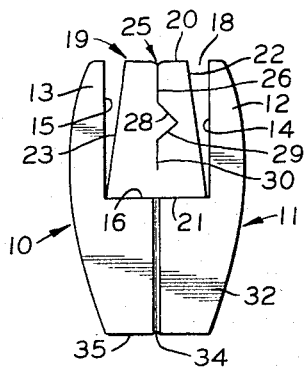
FIG. I
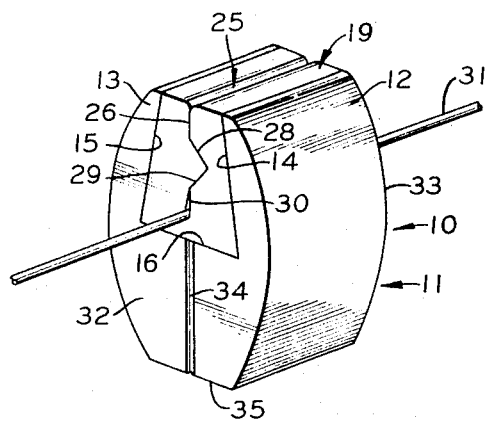
FIG. 2
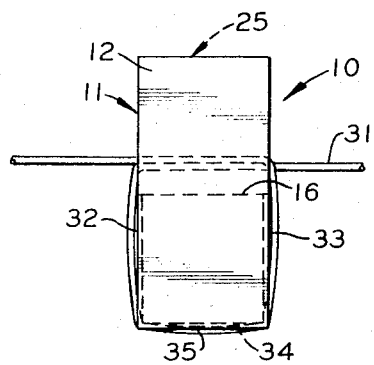
FIG. 3
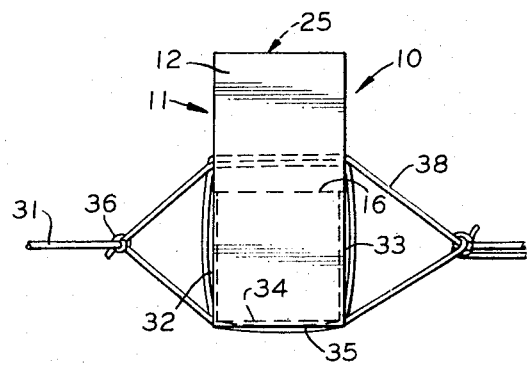
FIG. 4
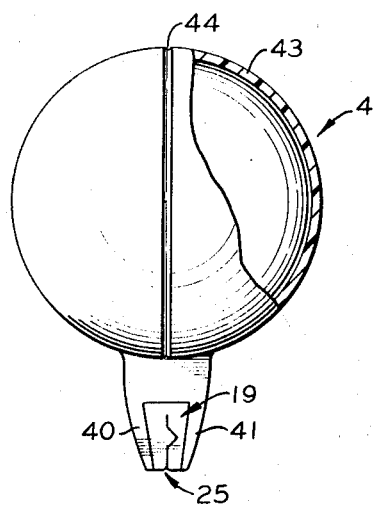
FIG. 5
INVENTOR.
CHARLES E. BITTAKER, JR
BY Hamilton o Cook
ATTORNEYS

United States Patent Office 3,293,792
Patented Dec. 27, 1966

3,293,792
FISHING LINE ACCESSORY
Charles E. Bittaker, Jr., Akron, Ohio, assignor to Pflueger Corporation, Akron, Ohio, a corporation of Ohio
Filed Nov. 4, 1964, Ser. No. 408,999
4 Claims. (Cl. 43—44.89)

The present invention relates generally to fishing equipment. More particularly, the present invention relates to a fishing accessory which is used in conjunction with a fishing line. Specifically, the present invention relates to a fishing line accessory the construction of which permits it to be utilized as a casting weight, a sinker, a line connector and even a bobber.

Anglers find that it is necessary to be able to change both the weight of the sinker, or sinkers, used and also their position on the line. This is occasioned not only by the feeding habits of the fish but also upon a variety of other factors—such as, the weight of the lure, the wind conditions above the water, the type and condition of the lake or stream bed as well as the ever-changing conditions of current, tides and the like.

The facility for such adaptability is not inherent with the historic "split shot" sinker. A "split shot", or clincher type, sinker, as all anglers know, is crimped firmly onto the line in the desired location either by plyers, teeth or other means readily at hand. Because of the way in which such a clincher type sinker is fastened, once it is applied to the line, it is most difficult, if not impossible, readily to change its position or remove it without injuring the line. Nor is this disadvantage limited to the clincher type sinker. Any type sinker or fishing line accessory which attaches to the line by pinching, or by bearing against a knot tied in the line, is not readily repositionable or removable and can impart excessive strain on the line as well as weaken it by abrasive wear.

Heretofore, those fishing line accessories which have been constructed in such a way as to be variably positionable along, and readily removable from, the line have required insertable pinch plugs, intricate moving parts or spring clips to effect their purpose. Some of these constructions also abrade the line, others lack the ability to be mounted slidably on the line when desired, many are not subject to repeated use, most are subject to breakage under use or deterioration from exposure and all are difficult to operate when the hands of the fisherman become cold and stiff.

It is therefore an object of the present invention to provide a fishing line accessory which can function as a sinker, line connector and/or a bobber.

It is another object of the present invention to provide a fishing line accessory, as above, which is readily attachable to and detachable from the line without damage thereto.

It is still another object of the present invention to provide a fishing line accessory, as above, which may be selectively mounted to maintain a fixed position on the line or be slidable therealong.

It is a further object of the present invention to provide a fishing line accessory, as above, which requires no moving parts, will not break under use or deteriorate upon exposure and which is readily attachable to, detachable from, and movable along the line without requiring a high degree of manual dexterity.

It is a still further object of the present invention to provide a fishing line accessory, as above, which can be mounted at any position along the line and which can serve as a convenient fast-make coupling member for joining lines, joining a line to a leader, or even joining a snelled hook to a line without kinking the snell.

These and other objects of the invention, and further advantages thereof, will become apparent from the following specification and are accomplished by means hereinafter described and claimed.

One preferred embodiment, together with the method for making the same, and one alternative embodiment are shown by way of example in the accompanying drawings and hereinafter described in detail without attempting to show all of the various forms and modifications in which the invention might be embodied; the invention being measured by the appended claims and not by the details of the specification.

In the drawings:

FIG. 1 is an end elevation of a fishing line accessory constructed according to the concept of the present invention and depicting the core element positioned loosely within the body;

FIG. 2 is a perspective of the accessory depicted in FIG. 1 showing the core element clinched within the body and mounted for slidability along a fishing line;

FIG. 3 is a side elevation of the subject accessory nonslidably mounted on a fishing line;

FIG. 4 is a view similar to FIG. 3 showing the accessory being used as a fast-make coupling connector; and, FIG. 5 is an alternative form of the subject accessory adapted to be used as a bobber.

In general, a fishing line accessory constructed according to the concept of the present invention has a resilient core member which is provided with a serpentine-like slit. The core member is nonremovably embraced between arms attached to the body of the accessory and which contact the core member laterally of the serpentine-like slit.

Referring more particularly to the drawings, one embodiment of the improved fishing line accessory, in the form of a sinker, is depicted generally by the numeral 10. The main body 11 of the sinker 10 has two outwardly extending, spaced apart arms 12 and 13. The opposed, parallel faces 14 and 15 of arms 12 and 13, respectively, together with the body wall 16 which extends therebetween define a generally U-shaped cavity 18, as shown in FIG. 1, into which the core element 19 is received.

The body 11 and the arms 12 and 13 extending outwardly therefrom may be made of lead or other suitably heavy material having a specific gravity greater than that of water to provide a sinker. The volumetric size of the body 11 and arms 12 and 13, as well as the length of the sinker 10, can be preselected as desired to provide sinkers having various weights.

The core element 19 is made of a resilient material, such as vulcanized rubber, and, for greatest efficiency, has a preferably trapezoidal cross section. Thus, the sides 20 and 21 are parallel and spaced apart with their ends joined by two nonparallel sides 22 and 23. As shown, the two nonparallel sides 22 and 23 may be of equal length so that the cross section of the core element 19 presents an isosceles trapezoid.

The core member 19 is received within the cavity 18 with the longer of the parellel sides 21 contracting the body wall 16 and with the nonparallel sides 22 and 23 converging outwardly away therefrom. With the keystonelike core element 19 thus positioned within the cavity 18 the arms 12 and 13 are permanently folded, or crimped against the core element 19 with the nonparallel sides 22 and 23 respectively engaging the faces 14 and 15 of arms 12 and 13. While such crimping has been found sufficient to retain a core element having the above described keystone cross section permanently in position, one may desire further to secure this result by roughening the faces 14 and 15 or by applying a water resistant adhesive material to join the core element 19 to the body 11 interiorly of the cavity 18, particularly if a different cross section is utilized.

A serpentine-like slit, indicated generally by the numeral 25, extends longitudinally through the core element 19 so that the arms 12 and 13 contact the core element 19 laterally of the slit 25. The serpentine nature of the slit has been found to be particularly important in retaining the line within the accessory while at the same time permitting the accessory to be slidably movable along the line.

As shown, the slit 25 is serpentined by having a plurality of angularly intersecting portions which are sequentially joined. Specifically, slit 25 has a first portion 26 which extends perpendicularly inwardly from the medial portion of the shorter of the two parallel sides 20. A second portion 28 continues inwardly from the innermost end of the first portion 26 at an angle of approximately 135° therefrom. A third portion 29 continues inwardly from the innermost end of the second portion 28 approximately normally thereto. A fourth portion 30 continues from the innermost end of the third portion 29 at an angle of approximately 135° with respect thereto so that it is, with the first portion 26, also oriented perpendicularly to the parallel sides 20 and 21.

To mount the accessory 10 on a line 31 one need only stretch a short segment of the line and guide it into the first portion 26 of the slit 25. Thereafter, a series of short back and forth movements of either the line 31 or the sinker 10 with pressure applied to cause the line to move inwardly along the slit 25 will cause the line to traverse the serpentine extent of the slit 25 and position at the innermost extent of the fourth portion 30 thereof. In this position the sinker 10 is attached to the line sufficiently firmly so as not to be moved by the normal casting procedure, yet a sudden force applied to the line or the sinker will permit the sinker 10 to slide longitudinally along the line 31 without damage thereto.

Should it be desired more fixedly to locate the accessory 10 on the line 31, it would be mounted as above described and then the line would be looped around the body 11 with a second extent of the line similarly inserted fully into the slit 25. By this arrangement, depicted in FIG. 3, the accessory 10 cannot be moved along the line 31. Nor can the line 31 become disengaged from the slit 25 except at the desire of the angler when relocating or removing the accessory. Of course, the accessory can be relocated along the line simply by grasping that portion of the line lying against one end 32 or 33 of the accessory and sliding that extent of the line which passes from that end of the accessory through the slit axially of itself to increase the size of the loop of the line embracing the accessory. After the one extent of the line passing through the slit has been thus slid sufficiently to bring the new position of the line at which the accessory is to be located within the slit, the second extent of the line passing through the slit is pulled axially therethrough to decrease the size of the loop until it again embraces the accessory. The accessory can thus be relocated without removing it from the line, even when mounted as shown in FIG. 3.

In order to protect that portion of the line looped around the body 11, it is necessary to assure that it is received in a groove 34 which extends at least along the body base 35 and desirably upwardly along the ends 32 and 33 of the body 11 as well.

The sinker 10 may also be used as a fast-make connector. As shown in FIG. 4, the line 31 is tied in a loop, as at 36, with one end of the loop received in the slit 25 and the other in groove 34. Either the looped snell 38 of a snelled hook or the loop of a leader, or the like, is similarly attached to the accessory 10 for it to comprise a fast-make connector.

As depicted in FIG. 5 the subject accessory may also be formed as a bobber. Alternatively, the accessory may be used as a sub-assembly in combination with a bobber or other device which one may wish to attach to the line. For use as in FIG. 5 the core element 19 may also be crimpedly received between two opposed arms 40 and 41 of a bobber 42. In order to function as a bobber, the accessory must, of course, float. This can be accomplished by forming the body in the shape of body 11 from a material having a specific gravity less than one, or by having the body 43 formed hollow, as shown in FIG. 5. Here too, the line may simply repose in the base of the slit 25, or it may be looped once around the bobber 42 to repose in an appropriate groove 44 and make two passes through the core element 19 to assure a fixed location of the bobber 42 along the line on which it is mounted.

To make such an accessory, the core element 19 may be extruded with its keystone shaped cross section in long lengths having the slit 25 formed by the extrusion process and then dusted to prevent its closure by the vulcanizing process. Alternatively, of course, the slit 25 may be cut after the core element 19 is vulcanized. The body 11 may also be extruded, and the core element 19 can thereafter be appropriately positioned in the cavity 18 of the extruded body 11. After the arms 12 and 13 are crimped against the core element 19 the conjoined body and core may be cut into appropriate lengths, those portions of the groove 34 extending up the ends 32 and 33 of the body 11 being formed by the cutter as the extruded lengths are cut into the desired segments.

It should thus be apparent from the above disclosure that a fishing line accessory made in accordance therewith can serve as a sinker, coupler and/or bobber, and otherwise accomplish the objects of the invention.

What is claimed is:

1. A fishing line accessory comprising, a rigid body portion, spaced apart arms extending outwardly therefrom, a resilient core member, said core member having a cross section in the shape of an isosceles trapezoid with two parallel sides of unequal length joined by two nonparallel sides of equal length, said core member received between said arms with the longer of said parallel sides facing said body portion and said nonparallel sides converging outwardly therefrom, a serpentine-like slit extending from the shorter of said two parallel sides toward the longer of said parallel sides along the full longitudinal extent of said core member, said arms pinchingly embracing said nonparallel sides laterally of said serpentine slit.

2. A fishing line accessory, as set forth in claim 1, in which a groove is provided in said body portion to receive a line positioned in said slit and looped around said body portion.

3. A fishing line accessory comprising, a body portion, arms extending outwardly therefrom, said arms being spaced apart, a resilient core element fixedly received between said arms, said core element having a slit extending longitudinally of said core element and accessible generally medially of said arms oppositely of said body portion to receive and anchor a fishing line extending longitudinally, the transverse cross section of said slit being serpentine.

4. A fishing line accessory, as set forth in claim 3, in which the serpentine slit is comprised of a plurality of sequentially abutting portions, the first portion extending inwardly of said core from the side thereof opposite said body portion, a second portion intersecting said first portion at approximately 135°, a third portion intersecting said second portion at approximately 90° and a fourth portion intersecting said third portion at approximately 135°.

References Cited by the Examiner

UNITED STATES PATENTS

| | | | |
|---|---|---|---|
| 1,243,881 | 10/1917 | Sandford | 43—44.95 |
| 1,626,278 | 4/1927 | Goodman | 29—509 |
| 2,395,878 | 3/1946 | Keene | 29—509 |
| 2,481,346 | 9/1949 | Rigby | 43—44.95 X |
| 2,703,945 | 3/1955 | Johnson | 43—44.91 X |
| 2,902,792 | 9/1959 | Friday | 43—44.87 |
| 3,192,662 | 7/1965 | Hoyle | 43—44.95 X |

FOREIGN PATENTS

| | | |
|---|---|---|
| 28,541 | 9/1921 | Denmark. |
| 479,258 | 3/1953 | Italy. |

SAMUEL KOREN, *Primary Examiner.*

D. J. LEACH, *Assistant Examiner.*